(12) United States Patent  
Lin et al.

(10) Patent No.: US 9,178,414 B2
(45) Date of Patent: Nov. 3, 2015

(54) JITTERING FREQUENCY CONTROL CIRCUIT AND METHOD FOR A SWITCHING MODE POWER SUPPLY

(75) Inventors: Kun-Yu Lin, Pingtung County (TW); Pei-Lun Huang, Hsinchu County (TW)

(73) Assignee: RICHPOWER MICROELECTRONICS CORPORATION, Grand Cayman, British West Indies (KY)

( * ) Notice: Subject to any disclaimer, the term of this patent is extended or adjusted under 35 U.S.C. 154(b) by 920 days.

(21) Appl. No.: 13/361,363

(22) Filed: Jan. 30, 2012

(65) Prior Publication Data

US 2012/0194227 A1 Aug. 2, 2012

(30) Foreign Application Priority Data

Feb. 1, 2011 (TW) .............................. 100103914 A

(51) Int. Cl.
*H02M 1/44* (2007.01)
*H02M 3/335* (2006.01)

(52) U.S. Cl.
CPC ............ *H02M 1/44* (2013.01); *H02M 3/33507* (2013.01)

(58) Field of Classification Search
CPC .................................. H02M 1/12; H02M 1/44
USPC .................. 323/283, 284; 327/113, 172, 175; 331/143, 153; 363/21.11, 18, 41; 713/501
See application file for complete search history.

(56) References Cited

U.S. PATENT DOCUMENTS

| 7,026,851 B2 * | 4/2006 | Yang et al. ..................... 327/172 |
| 7,184,283 B2 * | 2/2007 | Yang et al. ..................... 363/41 |
| 7,701,305 B2 * | 4/2010 | Lin et al. ..................... 331/143 |
| 7,728,571 B2 * | 6/2010 | Chuang et al. ................ 323/283 |
| 2011/0085359 A1 * | 4/2011 | Gong et al. ................ 363/21.18 |

* cited by examiner

*Primary Examiner* — Adolf Berhane
*Assistant Examiner* — Jye-June Lee
(74) *Attorney, Agent, or Firm* — Muncy, Geissler, Olds & Lowe, P.C.

(57) ABSTRACT

A jittering frequency control circuit and method for a switching mode power supply enlarge the uttering frequency range of the switching frequency of the switching mode power supply when the switching mode power supplier enters a frequency reduction mode, to improve the electro-magnetic interference of the switching mode power supply operating with the frequency reduction mode.

7 Claims, 6 Drawing Sheets

JITTERING FREQUENCY CONTROL CIRCUIT AND METHOD FOR A SWITCHING MODE POWER SUPPLY

FIELD OF THE INVENTION

The present invention is related generally to a switching mode power supply and, more particularly, to a jittering frequency control circuit and method for a switching mode power supply.

BACKGROUND OF THE INVENTION

Pulse width modulation (PWM) has been extensively applied to various electronic devices. For example, PWM controllers are used in switching mode power supplies to modulate duty cycles or switching frequencies of power switches and thereby modulate output voltages.

Recently, due to energy shortages and the rising awareness of environmental protection, the energy saving feature of switching mode power supplies has drawn more and more attention. At the same time, laws and regulations were passed to impose stricter requirements on the power conversion efficiency of switching mode power supplies at light load and in standby mode. When a switching mode power supply is working at light load or in standby mode, the switching loss of its power switches accounts for a significant proportion of the overall power consumption. To increase the light loading and standby power conversion efficiency of switching mode power supplies, some power management integrated circuits (ICs) on the market are designed to lower the switching frequencies of power switches so that switching loss can be significantly reduced. Moreover, switching mode power supplies, though advantageously more compact than conventional linear power supplies, have another problem that electro-magnetic interference (EMI) caused by the switching elements. Jittering frequency technique is typically used to improve EMI problem in existing power management ICs.

Switching mode power supplies have a variety of types. While the feedback loop and PWM loop designs vary from one type to another, the PWM controllers in all such power supplies generate and control their PWM signals according to output feedback signals, which may be either voltages or currents. For instance, the switching mode power supply shown in FIG. 1 has a flyback configuration in which the PWM controller 10 needs the output information provided by an isolated feedback circuit that includes an optical coupler 12 and a shunt regulator 14. The shunt regulator 14 detects the output voltage Vo of the flyback power supply and controls the feedback current Icomp on the pin COMP of the PWM controller 10 accordingly. Based on the feedback current Icomp, a circuit in the PWM controller 10 generates a feedback voltage Vcomp which is proportional to the output voltage Vo. From the feedback voltage Vcomp, the PWM controller 10 can identify whether the flyback power supply is operating at light load or heavy load.

The flyback power supply shown in FIG. 1 provides the output power $$Po = (1/2) \times Lp \times (X1 \times Vcs/Rcs)^2 \times fs \times \eta \quad \text{[Eq-1]}$$
$$= (1/2) \times Lp \times (X2 \times Vcomp/Rcs)^2 \times fs \times \eta,$$

where Lp is the magnetizing inductance of the transformer T1, Rcs is the current sense resistor, Vcs is the voltage across the current sense resistor Rcs, fs is the switching frequency of the power switch M1, $\eta$ is the conversion efficiency of the transformer T1, and X1 and X2 are constant coefficients.

The switching frequency of a conventional constant frequency switching mode power supply with jittering frequency is not affected by the output feedback signal. Taking the flyback power supply shown in FIG. 1 for example, the equation Eq-1 shows that, if the output power Po is fixed, the feedback voltage Vcomp will vary with the jittered switching frequency fs. Referring to FIG. 2, the waveform 20 represents the switching frequency fs having a fixed jittering frequency range $\Delta$fs, and the waveform 22 represents the feedback voltage Vcomp. The feedback voltage Vcomp decreases as the switching frequency fs increases. However, when working at light load or in standby mode, this type of PWM controller cannot reduce the switching frequency fs according to the feedback voltage Vcomp to reduce switching loss.

On the other hand, the switching frequency of a conventional variable frequency switching mode power supply with jittering frequency is adjustable by an output feedback signal; that is to say, the light-load or standby-mode switching frequency can be reduced according to the output feedback signal. Taking the flyback power supply shown in FIG. 1 for example, after entering the light-load (frequency reduction) mode, under a constant output power Po, the variable frequency PWM controller 10 with jittering frequency will lower the switching frequency fs according to the feedback voltage Vcomp. At the same time, however, the feedback voltage Vcomp changes with the jittered switching frequency fs. Thus, a relationship is formed between the feedback voltage Vcomp and the switching frequency fs, and a new stable equilibrium point is eventually reached after back-and-forth adjustments. Referring to FIG. 3, the waveforms of the switching frequency fs and of the feedback voltage Vcomp are changed from the waveforms 30 and 32 to the waveforms 34 and 36, respectively. Because of that, the jittering frequency range of the switching frequency fs is narrowed down from $\Delta$fs1 to $\Delta$fs2, which nevertheless results in increased EMI during the frequency reduction mode.

SUMMARY OF THE INVENTION

An objective of the present invention is to provide a jittering frequency control circuit and method for a switching mode power supply.

Another objective of the present invention is to provide a jittering frequency control circuit and method for adjusting a jittering frequency range of a switching mode power supply.

A further objective of the present invention is to provide a jittering frequency control circuit and method for improving EMI of a switching mode power supply in a frequency reduction mode.

According to the present invention, a jittering frequency control circuit for a switching mode power supply includes an oscillator and a jittering frequency modulator. The oscillator provides a frequency jittered clock whose frequency determines the switching frequency of the switching mode power supply. The jittering frequency modulator generates a jittering frequency adjust signal according to an output feedback signal and a reference signal and thereby adjusts the range of the jittering frequency. Preferably, when the switching mode power supply enters a frequency reduction mode, the jittering frequency modulator adjusts at least one of the upper limit and the lower limit of the jittering frequency adjust signal, to expand the range of the jittering frequency and thereby improve EMI of the switching mode power supply in the frequency reduction mode.

According to the present invention, a jittering frequency control method for a switching mode power supply provides a clock having a jittering frequency to determine the switching frequency of the switching mode power supply, and generates a jittering frequency adjust signal according to an output feedback signal and a reference signal to adjust the range of the jittering frequency. Preferably, when the switching mode power supply enters a frequency reduction mode, at least one of the upper limit and the lower limit of the jittering frequency adjust signal is adjusted to expand the range of the jittering frequency and thereby improve EMI of the switching mode power supply in the frequency reduction mode.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
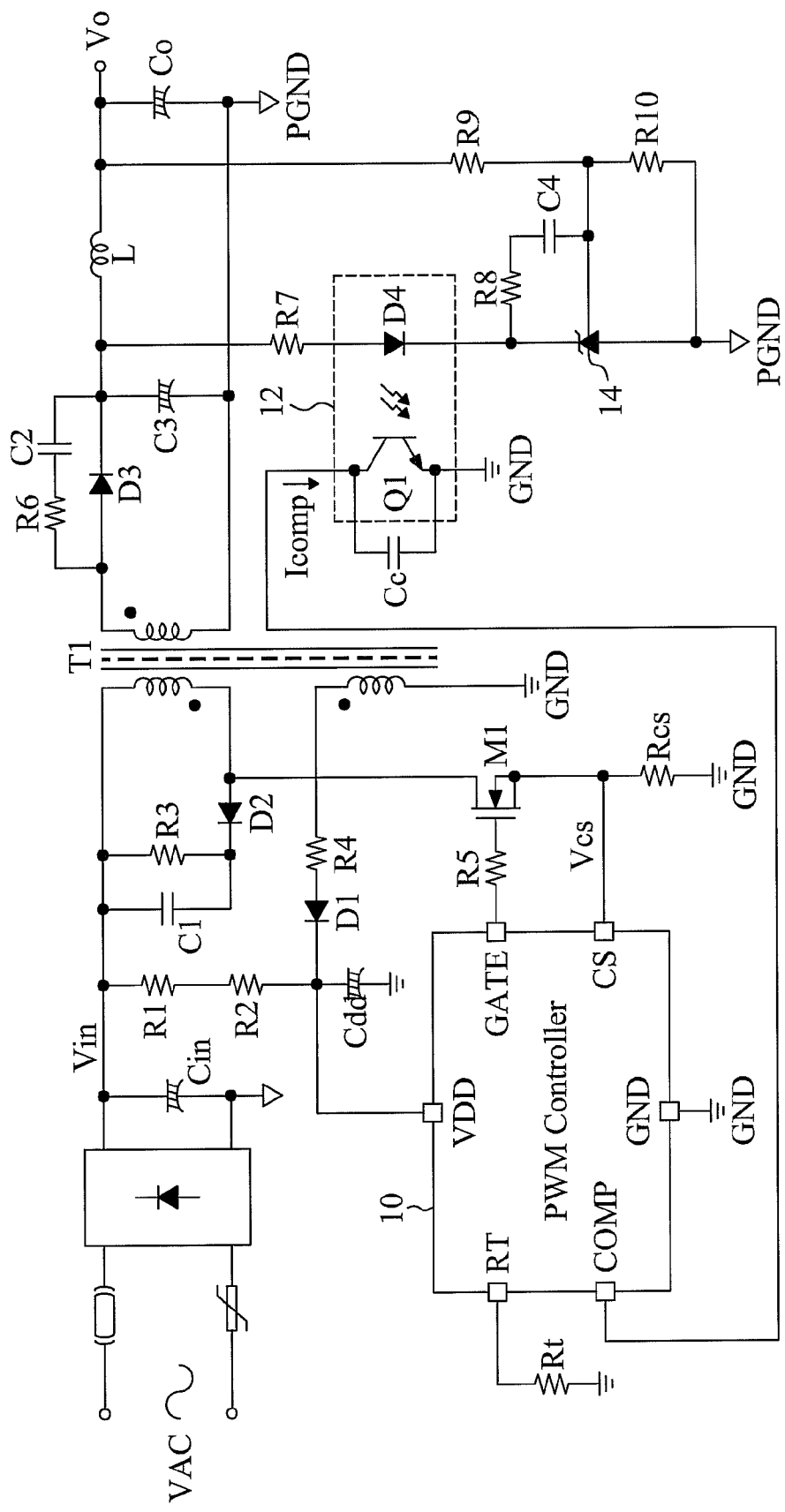
FIG. 1 is a circuit diagram of a conventional flyback power supply.
Figure 2:
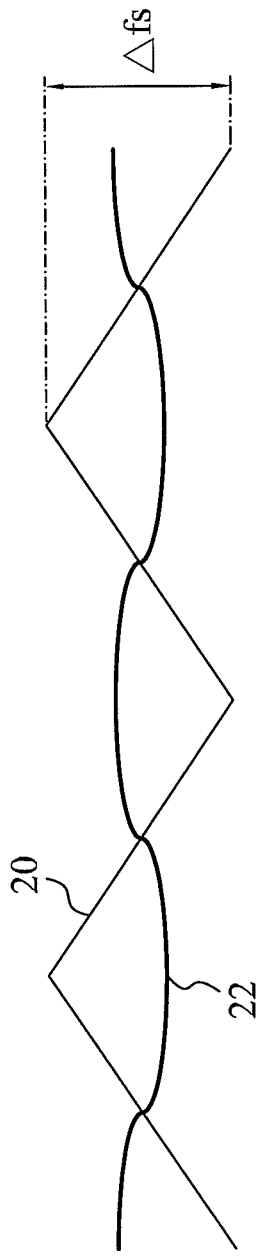
FIG. 2 shows a relationship between the switching frequency and the feedback voltage of a constant frequency switching mode power supply with jittering frequency.
Figure 4:
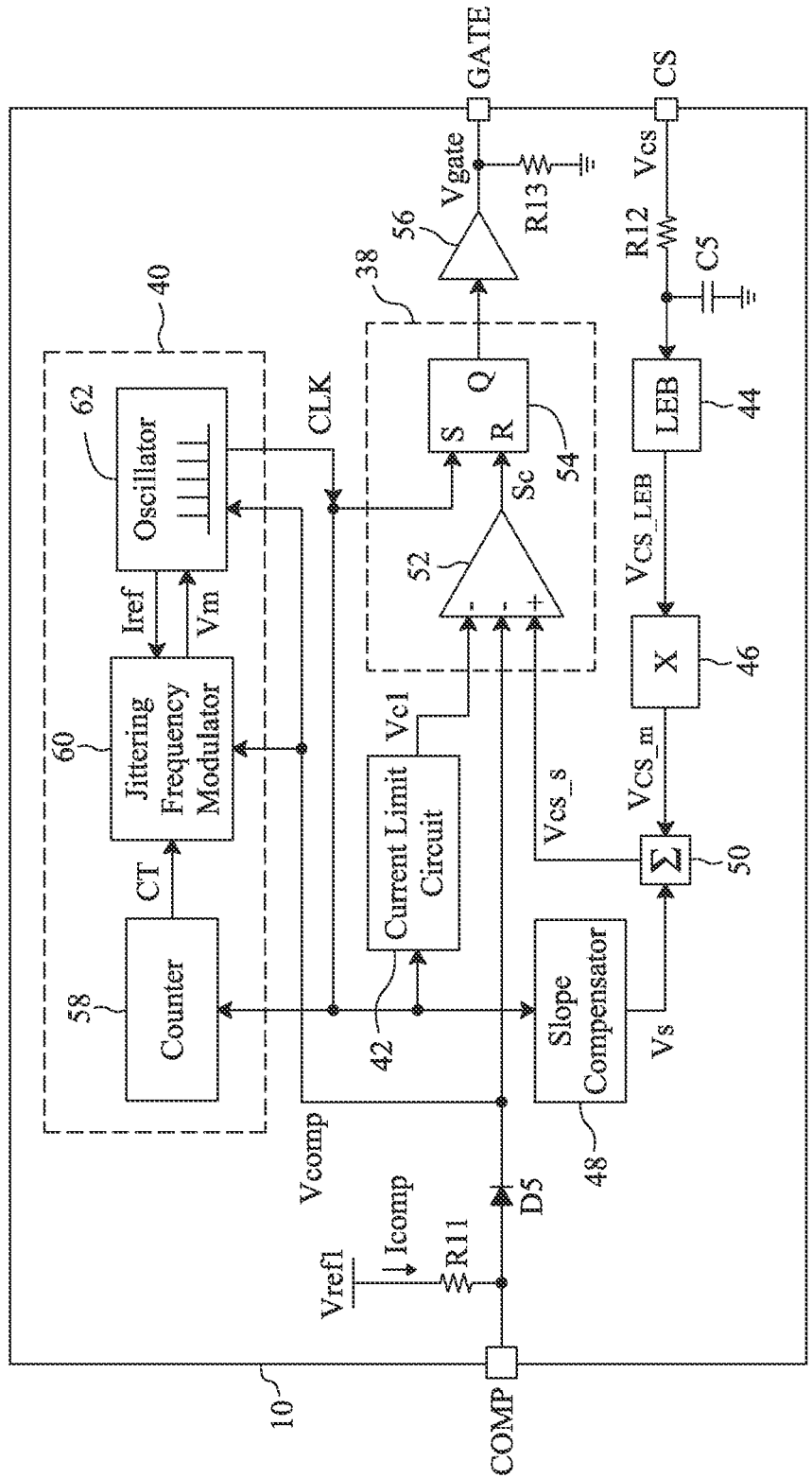
FIG. 4 is a circuit diagram of a PWM controller using a jittering frequency control circuit according to the present invention.

Referring to FIG. 4, in a PWM controller 10, the clock CLK needed by the pulse width modulator 38 is provided by a jittering frequency control circuit 40 according to the present invention, to adjust the jittering frequency range of the switching frequency of the PWM signal Vgate. This PWM controller 10 can be applied to a flyback power supply as shown in FIG. 1 to improve EMI thereof in a frequency reduction mode. As in the known PWM loops, a current limit circuit 42 generates a current limit signal Vc1 according to the clock CLK, a leading-edge blanking circuit 44 generates a signal Vcs_LEB according to the voltage Vcs received by the pin CS, a multiplier 46 generates a signal Vcs_m according to the signal Vcs_LEB, a slope compensator 48 generates a compensate signal Vs according to the clock CLK, an adder 50 generates a signal Vcs_s according to the signal Vcs_m and the compensate signal Vs, a comparator 52 generates a signal Sc according to the current limit signal Vc1, a feedback voltage Vcomp from the pin COMP and the signal Vcs_s, an SR flip-flop 54 generates an output Q according to the clock CLK and the signal Sc, and according to the output Q of the SR flip-flop 54, a gate driver 56 generates the PWM signal Vgate supplied to the pin GATE to switch the power switch M1. The SR flip-flop 54 is triggered by the clock CLK and reset by the signal Sc. The switching frequencies of the PWM signal Vgate and of the power switch M1 are equal to the frequency fs of the clock CLK.

In the jittering frequency control circuit 40, a counter 58 counts the clock CLK to generate a count value CT, a jittering frequency modulator 60 receives the count value CT, the feedback voltage Vcomp and a reference signal Iref provided by the oscillator 62, and supplies a jittering frequency adjust signal Vm to the oscillator 62. The oscillator 62 determines the frequency fs of the clock CLK according to the jittering frequency adjust signal Vm and the feedback voltage Vcomp, and the jittering frequency adjust signal Vm controls the jittering frequency range of the clock CLK.

Figure 3:
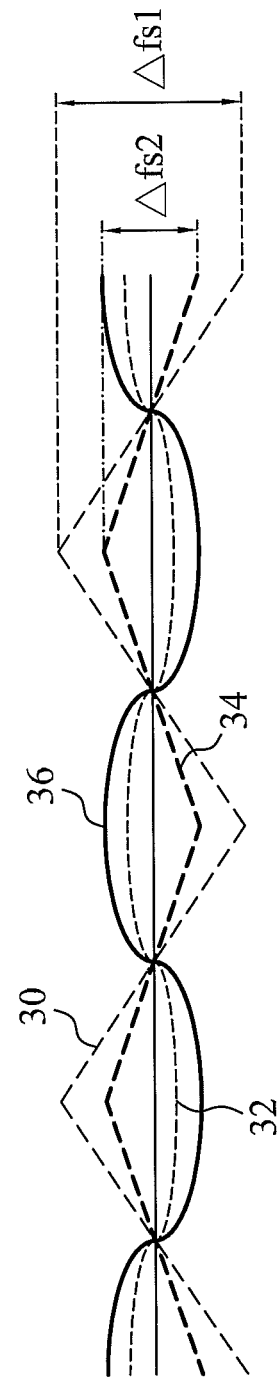
FIG. 3 shows a relationship between the switching frequency and the feedback voltage of a variable frequency switching mode power supply with jittering frequency.
Figure 5:
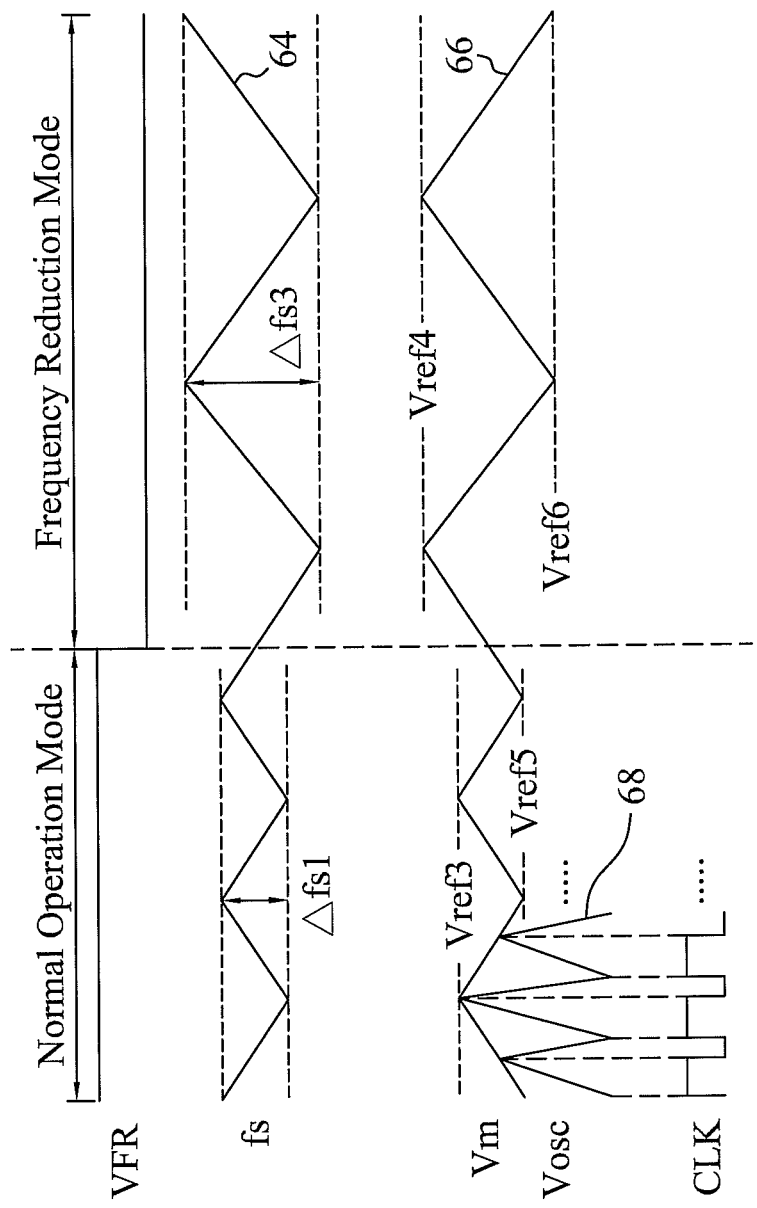
FIG. 5 is a waveform diagram of a jittering frequency adjust signal and a jittering frequency range.

Referring to FIGS. 4 and 5, in the normal operation mode of the flyback power supply, the uttering frequency adjust signal Vm provided by the jittering frequency modulator 60 has an upper limit Vref3 and a lower limit Vref5, as shown by the waveform 66, and the oscillator 62 compares an internal oscillating signal Vosc with the jittering frequency adjust signal Vm to generate the clock CLK, as shown by the waveform 68. The oscillating signal Vosc has a constant increasing slope, and thus the frequency fs of the clock CLK decreases or increases as the jittering frequency adjust signal Vm increases or decreases, and a jittering frequency is generated. The upper limit Vref3 and the lower limit Vref5 of the jittering frequency adjust signal Vm determine the jittering frequency range $\Delta fs1$ of the frequency fs, as shown by the waveform 64. Once the flyback power supply enters the frequency reduction mode, the jittering frequency modulator 60 raises the upper limit of the jittering frequency adjust signal Vm from Vref3 to Vref4, and lowers the lower limit from Vref5 to Vref6. As a result, the jittering frequency range is expanded from $\Delta fs1$ to $\Delta fs3$. Meanwhile, the oscillator 62 lowers the frequency fs of the clock CLK according to the feedback voltage Vcomp, for example, by changing the increasing slope or the starting level of the oscillating signal Vosc according to the feedback voltage Vcomp. As shown in FIG. 3, due to the relationship between the feedback voltage Vcomp and the frequency fs, the jittering frequency range $\Delta fs3$ of the frequency fs in the frequency reduction mode will be reduced; however, with $\Delta fs3$ being greater than $\Delta fs1$, the reduced jittering frequency range $\Delta fs3$ is greater than $\Delta fs2$. Thus, the EMI problem is improved. The reduced jittering frequency range $\Delta fs3$ is preferably greater than or equal to $\Delta fs1$.

Figure 6:
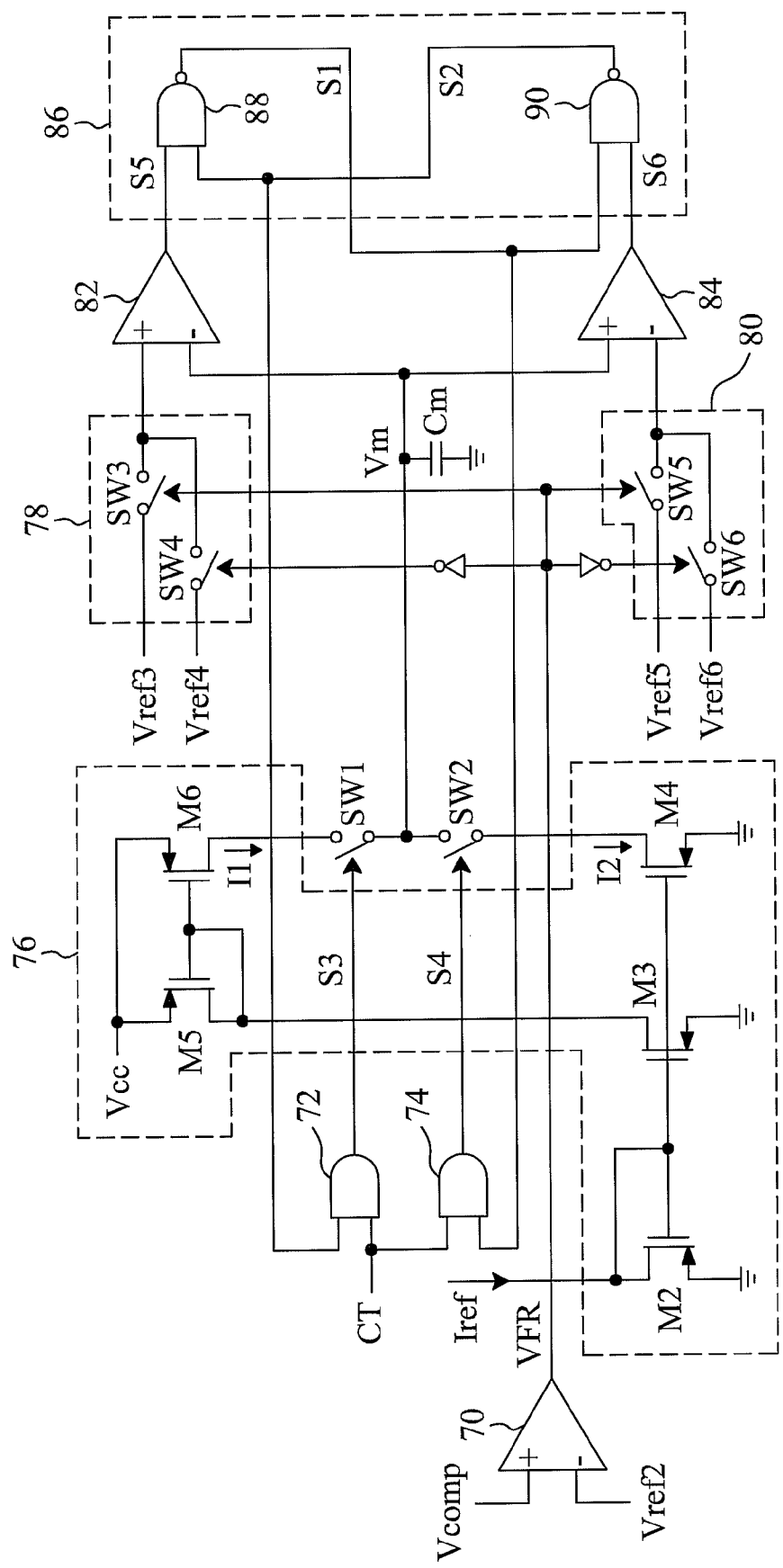
FIG. 6 is a circuit diagram of a first embodiment for the jittering frequency modulator shown in FIG. 4.

FIG. 6 is a circuit diagram of a first embodiment for the jittering frequency modulator 60 shown in FIG. 4. In this embodiment, the jittering frequency adjust signal Vm is a voltage provided by a capacitor Cm, the reference signal Iref is a current, a current mirror circuit 76 mirrors the current Iref to generate a charge current I1 and a discharge current I2, an AND gate 72 generates a signal S3 according to the count value CT and a signal S2, an AND gate 74 generates a signal S4 according to the count value CT and a signal S1, a switch SW1 is connected between the current mirror circuit 76 and the capacitor Cm and, in response to the signal S3, switches the charge current I1 to charge the capacitor Cm, a switch SW2 is connected between the current mirror circuit 76 and the capacitor Cm and, in response to the signal S4, switches the discharge current I2 to discharge the capacitor Cm, a comparator 70 compares the feedback voltage Vcomp with a threshold Vref2 to generate a comparison signal VFR, based on the comparison signal VFR, a selector 78 selects one of the normal upper limit Vref3 and the frequency reduction upper limit Vref4 to supply to a positive input terminal of the comparator 82, whose negative input terminal is connected to the capacitor Cm, the comparator 82 compares the voltages at its two input terminals to generate a signal S5, based on the comparison signal VFR, a selector 80 selects one of the normal lower limit Vref5 and the frequency reduction lower limit Vref6 to supply to the negative input terminal of a comparator 84, whose positive input terminal is connected to the capacitor Cm, a comparator 84 compares the voltages at its two input terminals to generate a signal S6, an SR flip-flop 86 includes NAND gates 88 and 90, the NAND gate 88 generates the signal S1 according to the signals S2 and S5, and the NAND gate 90 generates the signal S2 according to the signals S1 and S6.

Counters are well known in the art, and the techniques for generating clock signals having a jittering frequency and reducing the frequency of a clock according to an output feedback signal are also well known in the art. Therefore, the internal circuits and operations of the counter 58 and of the oscillator 62 are not detailed herein.

Referring to FIGS. 5 and 6, while the flyback power supply operates in the normal operation mode, the feedback voltage Vcomp is greater than the threshold Vref2, the comparison signal VFR generated by the comparator 70 is high, and consequently, the selector 78 selects the normal upper limit Vref3 for the positive input terminal of the comparator 82 as the upper limit of the jittering frequency adjust signal Vm, and the selector 80 selects the normal lower limit Vref5 for the negative input terminal of the comparator 84 as the lower limit of the jittering frequency adjust signal Vm. Once the flyback power supply enters the frequency reduction mode, the feedback voltage Vcomp is lower than the threshold Vref2, so the comparison signal VFR generated by the comparator 70 is low. As a result, the selectors 78 and 80 select the frequency reduction upper limit Vref4 and the frequency reduction lower limit Vref6 as the upper and lower limits of the jittering frequency adjust signal Vm, respectively.

In the embodiment shown in FIG. 6, the jittering frequency modulator 60 expands the jittering frequency range of the clock CLK by adjusting the upper and lower limits of the jittering frequency adjust signal Vm. In other embodiments, however, it is feasible to adjust only the upper or lower limit of the jittering frequency adjust signal Vm to expand the jittering frequency range of the clock CLK.

Figure 7:
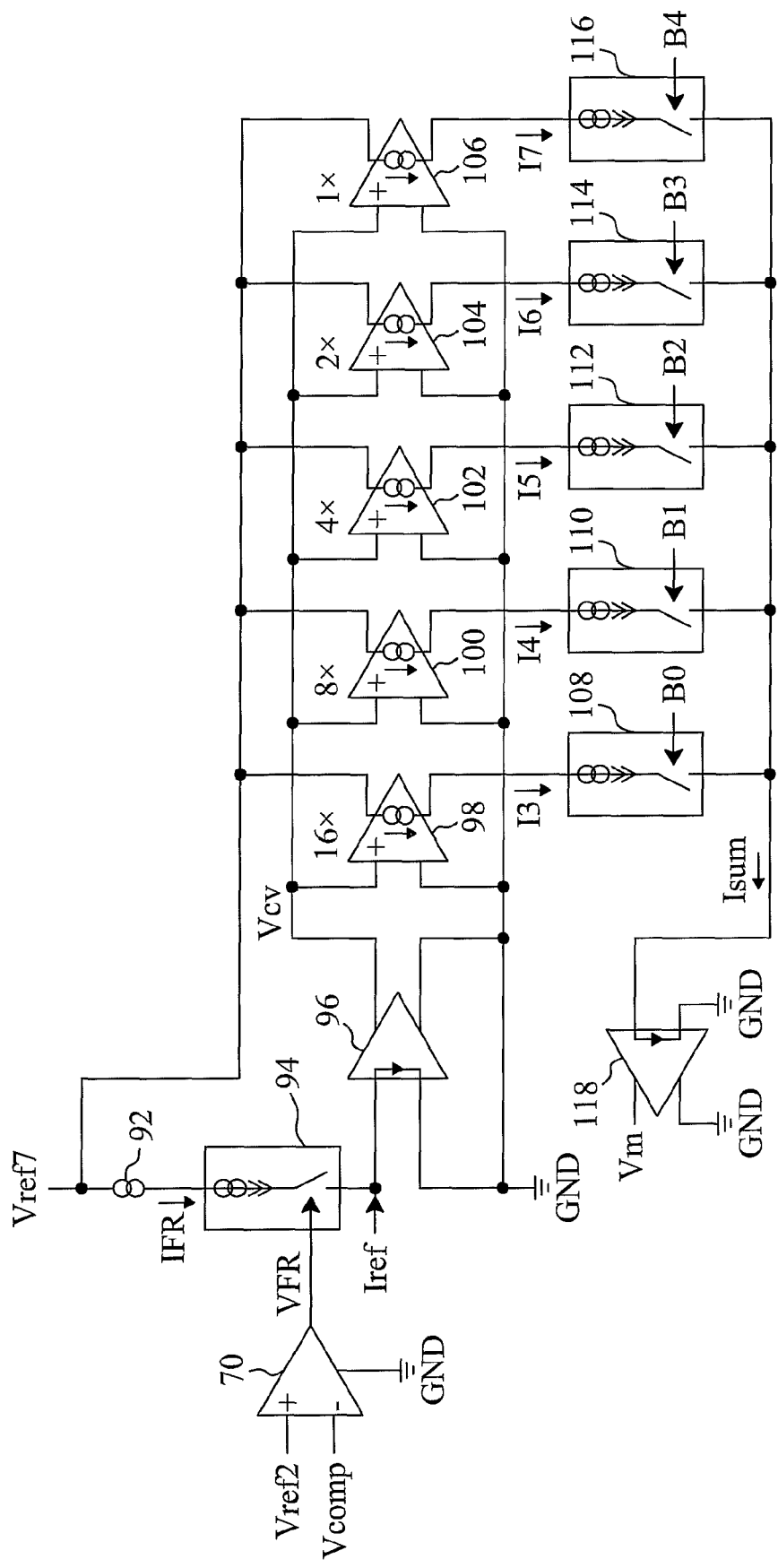
FIG. 7 is a circuit diagram of a second embodiment for the jittering frequency modulator shown in FIG. 4.

FIG. 7 is a circuit diagram of a second embodiment for the jittering frequency modulator 60 shown in FIG. 4. As in the circuit of FIG. 6, the comparator 70 compares the feedback voltage Vcomp with the threshold Vref2 to generate the comparison signal VFR. A current-to-voltage converter 96 has an input terminal to receive the reference current Iref. A current source 92 provides an adjust current IFR, and a switch 94 is connected between a current source 92 and the input terminal of the current-to-voltage converter 96 and is controlled by the comparison signal VFR. A voltage Vcv generated by the current-to-voltage converter 96 is converted by voltage-to-current converters 98-106 into currents I3-I7, respectively, a switch 108 is connected between an output terminal of a voltage-to-current converter 98 and an input terminal of the current-to-voltage converter 118, a switch 110 is connected between an output terminal of the voltage-to-current converter 100 and the input terminal of the current-to-voltage converter 118, a switch 112 is connected between an output terminal of the voltage-to-current converter 102 and the input terminal of the current-to-voltage converter 118, a switch 114 is connected between an output terminal of the voltage-to-current converter 104 and the input terminal of the current-to-voltage converter 118, a switch 116 is connected between an output terminal of the voltage-to-current converter 106 and the input terminal of the current-to-voltage converter 118. The count value CT coming from the counter 58 includes bits B0-B4 to control the switches 108-116 and thereby turn on or off the voltage-to-current converters 98-106, respectively, the total current Isum to the input terminal of the current-to-voltage converter 118 is thus determined, and the current-to-voltage converter 118 converts this total current Isum into the jittering frequency adjust signal Vm. When the flyback power supply enters the frequency reduction mode, the comparison signal VFR turns on the switch 94 and thereby turns on the current source 92, allowing an adjust current IFR to flow to the input terminal of the current-to-voltage converter 96, so that the output voltage Vcv of the current-to-voltage converter 96 increases, and the currents I3-I7 provided by the voltage-to-current converters 98-106 increase with the voltage Vcv. This increases the maximum value of the total current Isum and raises the upper limit of the jittering frequency adjust signal Vm; as a result, the jittering frequency range of the frequency fs of the clock CLK is enlarged. While the embodiment of FIG. 7 expands the jittering frequency range of the clock CLK by adjusting the upper limit of the jittering frequency adjust signal Vm, it is feasible in other embodiments to expand the jittering frequency range of the clock CLK by adjusting the lower limit of the jittering frequency adjust signal Vm instead.

The embodiment shown in FIG. 4 is a circuit designed only to illustrate the principles of the present invention; therefore, the present invention is by no means limited to that particular circuit alone. As shown by the embodiment of FIG. 4, the present invention uses the jittering frequency control circuit 40 to replace the conventional clock generator, and the jittering frequency control circuit 40 controls the jittering frequency range of the clock CLK according to the feedback voltage Vcomp for achieving the purpose of the present invention. Hence, there is no need to modify the other circuits of the PWM controller 10 when adopting the jittering frequency control circuit 40. This also means that the solution proposed by the present invention is equally applicable to other types of switching mode power supplies and a variety of PWM controllers. In other embodiments, the output feedback signal used by the jittering frequency control circuit 40 can be either a voltage or a current, and the reference signal can also be a voltage or a current.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A jittering frequency control circuit for a switching mode power supply, comprising:
   an oscillator configured to operably provide a clock having a jittering frequency to determine a switching frequency of the switching mode power supply; and
   a jittering frequency modulator connected to the oscillator, operative to generate a jittering frequency adjust signal according to an output feedback signal of the switching mode power supply and a reference signal provided by the oscillator and supply the jittering frequency adjust signal to the oscillator to control a jittering frequency range of the switching frequency;
   wherein the jittering frequency modulator comprises:
   a capacitor configured to operably provide a voltage as the jittering frequency adjust signal;
   a current mirror configured to operably generate a charge current and a discharge current according to the reference signal;
   a first switch connected between the capacitor and the current mirror, responsive to a first signal to switch the charge current to charge the capacitor;

a second switch connected between the capacitor and the current mirror, responsive to a second signal to switch the discharge current to discharge the capacitor;

a first comparator connected to the capacitor, having a negative input terminal to receive the jittering frequency adjust signal;

a second comparator connected to the capacitor, having a positive input terminal to receive the jittering frequency adjust signal;

a third comparator configured to operably compare the output feedback signal with a threshold to generate a comparison signal;

a first selector connected to the first comparator and the third comparator, operative to select one of a normal upper limit and a frequency reduction upper limit according to the comparison signal to supply to a positive input terminal of the first comparator;

a second selector connected to the second comparator and the third comparator, operative to select one of a normal lower limit and a frequency reduction lower limit according to the comparison signal to supply to a negative input terminal of the second comparator; and a flip-flop connected to the first comparator and the second comparator operative to determine the first signal and the second signal according to an output of the first comparator and an output of the second comparator.

2. The jittering frequency control circuit of claim 1, wherein the jittering frequency modulator determines an upper limit and a lower limit of the jittering frequency adjust signal according to the output feedback signal.

3. The jittering frequency control circuit of claim 1, wherein the jittering frequency modulator determines an increasing slope and a decreasing slope of the jittering frequency adjust signal according to the reference signal.

4. The jittering frequency control circuit of claim 1, wherein the jittering frequency modulator increases an upper limit of the jittering frequency adjust signal when the output feedback signal is lower than a threshold, to expand the jittering frequency range.

5. The jittering frequency control circuit of claim 1, wherein the jittering frequency modulator decreases a lower limit of the jittering frequency adjust signal when the output feedback signal is lower than a threshold, to expand the jittering frequency range.

6. The jittering frequency control circuit of claim 1, wherein the jittering frequency modulator increases an upper limit of the jittering frequency adjust signal and decreases a lower limit of the jittering frequency adjust signal when the output feedback signal is lower than a threshold, to expand the jittering frequency range.

7. A jittering frequency control circuit for a switching mode power supply, comprising:

an oscillator configured to operably provide a clock having a jittering frequency to determine a switching frequency of the switching mode power supply; and a jittering frequency modulator connected to the oscillator, operative to generate a jittering frequency adjust signal according to an output feedback signal of the switching mode power supply and a reference signal provided by the oscillator and supply the jittering frequency adjust signal to the oscillator to control a jittering frequency range of the switching frequency;

wherein the jittering frequency modulator comprises:

a first current-to-voltage converter having an input terminal to receive the reference signal, configured to operably convert a current at the input terminal of the first current-to-voltage converter into a voltage;

a current source connected to the input terminal of the first current-to-voltage converter to provide an adjust current to the input terminal of the first current-to-voltage converter;

a comparator configured to operably compare the output feedback signal with a threshold to generate a comparison signal for turning on or off the current source;

a plurality of voltage-to-current converters each having an input terminal connected to an output terminal of the first current-to-voltage converter, configured to operably convert a voltage at the output terminal of the first current-to-voltage converter into a current; and a second current-to-voltage converter having an input terminal connected to output terminals of the plurality of voltage-to-current converters, configured to operably convert a current at the input terminal of the second current-to-voltage converter into the jittering frequency adjust signal;

wherein the current at the input terminal of the second current-to-voltage converter is determined by controlling a number of the plurality of voltage-to-current converters that are turned on.

* * * * *